March 3, 1970 M. J. KJOS 3,498,569

COAXIAL TAPE STORAGE REEL DRIVE MODULE

Filed Dec. 8, 1967

INVENTOR.
MAGNE JARLE KJOS
BY
Christie, Parker & Hale
ATTORNEYS.

United States Patent Office 3,498,569

Patented Mar. 3, 1970

3,498,569

COAXIAL TAPE STORAGE REEL DRIVE MODULE

Magne Jarle Kjos, Duarte, Calif., assignor to Burroughs Corporation, Detroit, Mich., a corporation of Michigan

Filed Dec. 8, 1967, Ser. No. 689,178

Int. Cl. G11b *15/32*

U.S. Cl. 242—193 7 Claims

ABSTRACT OF THE DISCLOSURE

A pair of coaxially arranged relatively rotatable tape storage reels are coupled by coaxial drive shafts to coaxial motors, i.e., motors having coaxial axes of rotation. Most advantageously, the motors each have disc-shaped armatures that are fixed to their respective shafts. The armatures have helical printed-circuit or punch-pressed windings that lie in planes perpendicular to the axes of the drive shaft. The motors are enclosed in a cylindrical housing having ends made of magnetic material, and a dividing ring of magnetic material is disposed between the armature of the two motors. Field magnet pairs are arranged within the housing with a pole adjacent to the surface of each armature. The magnets of each pair are side by side and oppositely oriented.

BACKGROUND OF THE INVENTION

This invention relates to the generation, transmission, and utilization of rotary power and, more particularly, to a coaxial drive system for delivering rotary power to coaxially arranged, independently rotatable tape storage reels.

Rayfield Patent 3,345,007, which issued on Oct. 3, 1967, to the assignee of the present application, discloses multiple station tape handling equipment in which each of four pairs of tape storage reels is coaxially arranged. Magnetic tape is guided between the reels of each pair in a common work plane along which the tape is driven past a transducer. This concept enables a plurality of tape handling stations to be arranged in an extremely compact area. It is also conducive to component sharing among the stations and permits easy access to the equipment for maintenance purposes.

In most high-speed tape handling equipment, the tape is temporarily stored in vacuum columns before and after the tape passes the transducer. This allows the tape to stop and start quickly without having to contend with the inertia of the tape storage reels. The supply reel and the take-up reel are independently rotated by separate drive systems so the length of the tape loop in one vacuum column can be controlled independently of the length of the tape loop in the other vacuum column. In the multiple station tape handling equipment disclosed in the above-mentioned Rayfield patent, coaxially arranged, relatively rotatable drive shafts must be provided to transmit rotary power independently to each pair of coaxially arranged reels. A drive system including such coaxial drive shafts is disclosed in Rayfield and Kjos Patent 3,443,766, which issued May 13, 1969, to the assignee of the present application. The coaxial drive shafts are separately driven by two motors balanced on opposite sides of the common axis of the drive shafts. The motors are coupled to their respective drive shafts by belts and pulleys fixed to the shafts. In this arrangement, the motors, the belts, and the pulleys occupy substantial space.

SUMMARY OF THE INVENTION

According to the invention, adjacent coaxial relatively rotatable tape storage reels are coupled by coaxial drive shafts to adjacent coaxial motors having axes of rotation in alignment with the axes of the respective drive shafts and reels. The coaxial drive shafts are disposed one inside of the other between the reels and the motors. The resulting coaxial reel drive module can be constructed in a very compact unit that occupies much less space than a system employing motors arranged side by side. When the invention is employed in multiple station tape handling apparatus, for example, more cabinet space is made available for other purposes such as the storage of electronic circuitry.

Preferably, the coaxial motors have disc-shaped armatures fixed to their respective drive shafts. The armatures have helical printed-circuit or punch-pressed windings, each lying in a plane perpendicular to the axes of the shafts. The motor is enclosed in a cylindrical housing having ends made of a magnetic material and a center dividing ring made of magnetic material that is disposed between the armatures of the motors. Field magnet pairs are located adjacent the surface of each armature. The magnets of each pair are located side by side and their poles are oriented opposite to one another.

BRIEF DESCRIPTION OF THE DRAWING

The features of a specific embodiment of the invention are illustrated in the drawing, in which.

DESCRIPTION OF A SPECIFIC EMBODIMENT

Figure 1:
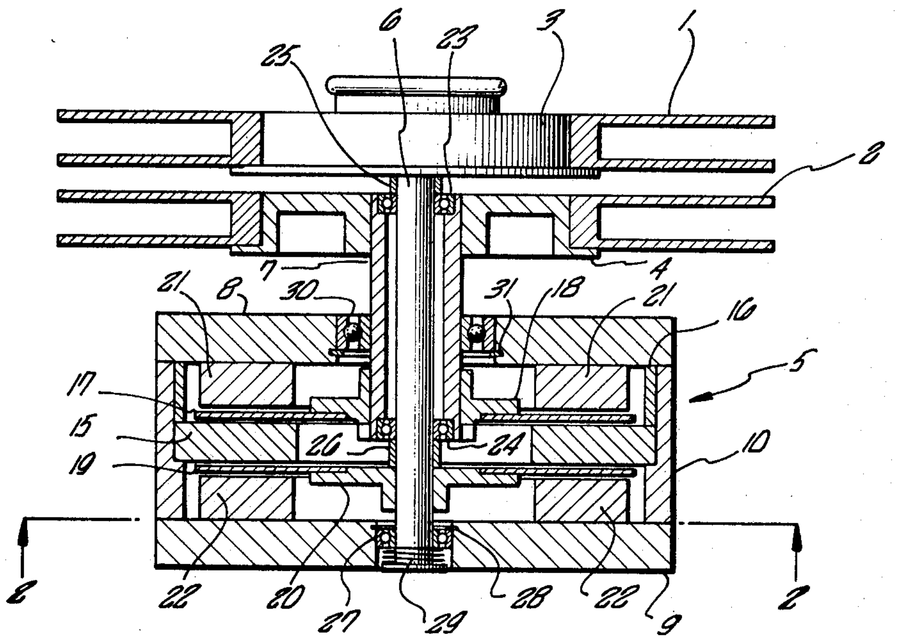
FIG. 1 is a side elevation view, in section, of a reel drive module incorporating the principles of the invention.

In the drawing, coaxially arranged tape storage reels 1 and 2 are shown mounted on reel support hubs 3 and 4 respectively. Reels 1 and 2 are coupled to a motor assembly 5 by coaxial, relatively rotatable drive shafts 6 and 7, respectively, which are fixed at the upper end to hubs 3 and 4 respectively.

Motor assembly 5 comprises two coaxial motors, i.e., motors that have coaxial axes of rotation. The motors are enclosed in a cylindrical housing having circular ends 8 and 9, which are made of a magnetic material such as soft iron, and a cylindrical side 10, which is made of nonmagnetic material such as aluminum. The axis of the cylindrical housing coincides with the axes of shafts 6 and 7. The interior of the housing is separated into two sections by a dividing ring 15, which is also made of magnetic material. The upper portion of the interior surface of side 10 is cut out to accommodate dividing ring 15. A cylindrical nonmagnetic spacer 16 between ring 15 and end 8 holds ring 15 in position. A disc-shaped armature 17 is fixed to the lower end of shaft 7 by a collet 18. Similarly, a disc-shaped armature 19 is fixed to the lower end of shaft 6 by a collet 20. Armatures 17 and 19 have helical printed-circuit or punch-pressed windings, each lying in a plane perpendicular to the axes of shafts 6 and 7. If the motors are so-called printed-circuit motors, armatures 17 and 19 would comprise two helical conductors etched on opposite surfaces of a circuit board. If armatures 17 and 19 were part of a so-called laminated winding motor, they would comprise a plurality of helical conductors, each stamped out of a thin sheet of conductive metal by a punch press. These punch-pressed helical conductors would be stacked, one on top of the other, and separated from each other by insulated sheets to form a laminated structure.

Figure 2:
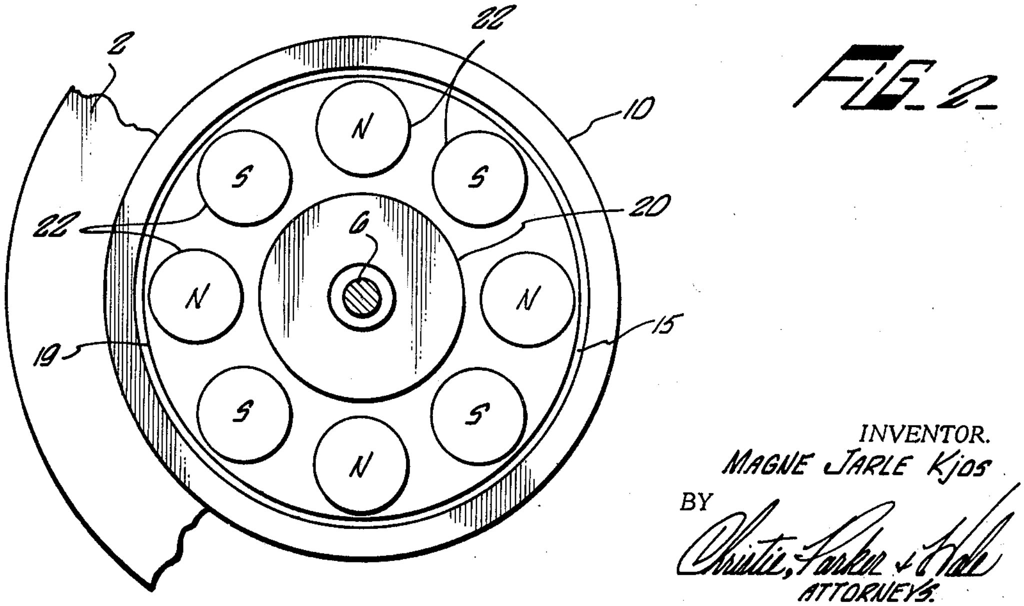
FIG. 2 is a bottom plan view, in section, of the drive module shown in FIG. 1.

Four pairs of cylindrical field magnets 21 are fixed to the inner surface of end 8 with a pole adjacent to the surface of armature 17. Similarly, four pairs of field magnets 22 are fixed to the inner surface of end 9 with a pole adjacent to the surface of armature 19. As illustrated in FIG. 2, the magnets of each pair are located side by side in a circle around the armature and are oriented with their poles opposite to one another, e.g., the north pole of one magnet is oriented the same way as the south pole of the other magnet. In FIG. 2, the letters N and S signify the north and south poles of magnets 22. The magnetic flux produced by magnets 21 and 22 is directed by the high reluctance path provided by ends 8 and 9 and dividing ring 15 so as to pass through the small gap between the magnets (21 or 22) and dividing ring 15 nearly parallel to the axes of shafts 6 and 7. This magnetic flux therefore passes through the windings of the armature (17 or 19) nearly perpendicular to the current flowing through them. A direct current is applied to the windings of armatures 17 and 19 by conventional graphite brushes which are not shown in the drawings. Consequently, a torque is developed on the armature (17 or 19) which is coupled through the collect (18 or 20) to the drive shaft (7 or 6). The torque developed by the motors is controlled by the current applied to their armature windings.

Drive shafts 6 and 7 are supported in a manner disclosed in the above-mentioned Patent 3,443,766. Specifically, shafts 6 and 7 are held in relatively rotatable relationship and in axial alignment with respect to one another by bearings 23 and 24. Bearings 23 and 24 are held in position by spacers 25 and 26, respectively, between reel support hub 3 and collect 20. At the lower end, shaft 6 is rotatably mounted in end 9 by a bearing 27, which is held in position by a retaining ring 28 and a compression spring 29. Shaft 7 is rotatably mounted in end 8 by a bearing 30, which is held in place by a retaining ring 31. Thus, shaft 6 and shaft 7 are each supported by the housing of the motor at one point. This is sufficient, however, to permit their axial rotation without lateral deflection because they are supported in axial alignment by bearings 23 and 24.

Instead of employing printed circuit or laminated winding motors as discussed above, the other types of motors having their components coaxially arranged to form a coaxial motor, could be employed to drive coaxial drive shafts in accordance with the invention.

Although the invention is illustrated with two coaxial tape reels, drive shafts, two coaxial motors, the principles of the invention are applicable to any number of reels and corresponding drive shafts and coaxial motors.

What is claimed is

1. A reel drive module comprising:
a plurality of coaxially arranged, relatively rotatable drive shafts disposed one inside of the other;
a plurality of adjacent coaxial motors disposed adjacent to one end of the drive shafts, one motor being connected to the adjacent end of one drive shaft and the other motor being connected to the adjacent end of the other drive shaft; and
a plurality of adjacent coaxial reels disposed adjacent to the other end of the drive shafts, one reel being connected to the adjacent end of one drive shaft and the other reel being connected to the adjacent end of the other drive shaft.

2. The system of claim 1, in which each motor has an armature fixed to the corresponding shaft and means for providing a magnetic field causing the armature to rotate upon application of a current to its windings.

3. The system of claim 2, in which the armatures are disc-shaped an have helical windings lying in planes perpendicular to the axes of the drive shafts.

4. The system of claim 3, in which the motors are enclosed in a housing having nonmagnetic sides coaxial with the axes of the drive shafts and ends of magnetic material perpendicular to the axes of the drive shafts, a dividing ring of magnetic material is disposed within the housing between the armatures, and a source of a magnetic field is fixed to one member and spaced from the other member to form a gap in which the armature is located.

5. A tape storage reel drive system comprising:
an inner shaft mounted to rotate about an axis;
a first tape storage reel hub mounted on the one end of the inner shaft;
an outer shaft surrounding the inner shaft and supported to rotate about the axis independently of the inner shaft, the one end of the inner shaft extending beyond the outer shaft;
a second tape storage reel hub mounted on the one end of the outer shaft adjacent to the first reel hub; and
a coaxial motor assembly coupled to the other end of the inner shaft and the other end of the outer shaft to apply rotary power independently to the inner shaft and the outer shaft.

6. The system of claim 5, in which the inner shaft extends beyond the outer shaft at the other end and the motor assembly comprises a first armature fixed to the inner shaft near the other end, a second armature fixed to the outer shaft near the other end, and means for applying a magnetic field to the first and second armatures oriented in such a direction that the first and second armatures rotate about the axis when a current is applied thereto.

7. The system of claim 5, in which a first bearing rotatably supports the outer shaft relative to one end of the housing, a second bearing rotatably supports the inner shaft relative to the other end of the housing, a third bearing rotatably supports the inner shaft relative to the outer shaft at a point between the first and second bearings, and a fourth bearing spaced from the third bearing rotatably supports the inner shaft relative to the outer shaft.

References Cited

UNITED STATES PATENTS

| | | | |
|---|---|---|---|
| 2,497,142 | 2/1950 | Shepherd | 242—54.1 |
| 2,800,619 | 7/1957 | Brunt | 310—112 X |
| 3,331,973 | 7/1967 | McClure | 310—46 |
| 3,363,852 | 1/1968 | Maxey. | |

FOREIGN PATENTS

| | | |
|---|---|---|
| 994,482 | 8/1951 | France. |

GEORGE F. MAUTZ, Primary Examiner

U.S. Cl. X.R.

310—46, 112